March 14, 1944.  J. F. HALSTEAD  2,343,902
METHOD OF MAKING CIGARS
Original Filed Oct. 27, 1938  5 Sheets-Sheet 1
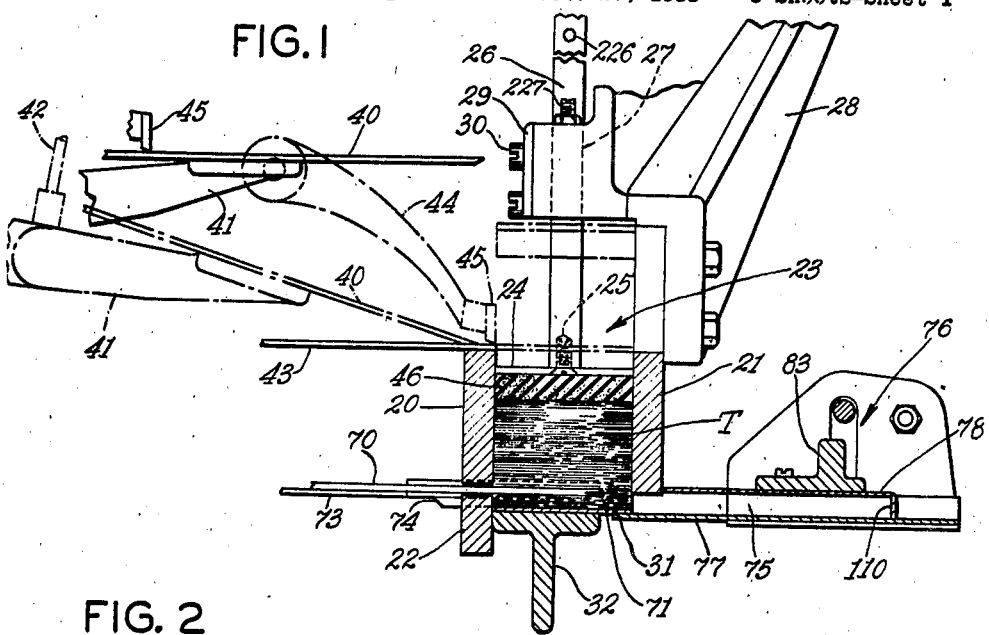
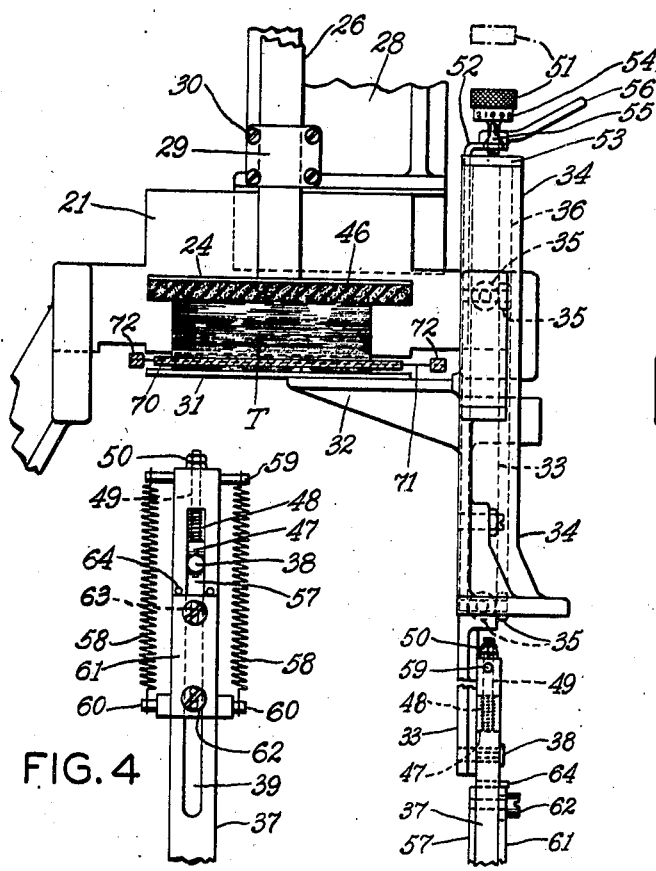
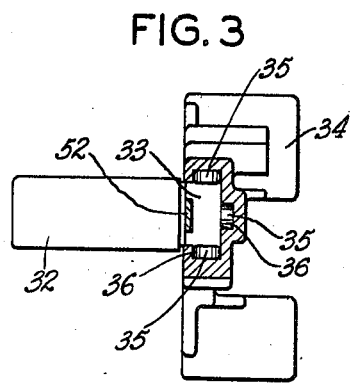
INVENTOR
JOHN F. HALSTEAD
BY George Hastings
ATTORNEY March 14, 1944.   J. F. HALSTEAD   2,343,902
METHOD OF MAKING CIGARS
Original Filed Oct. 27, 1938   5 Sheets-Sheet 2
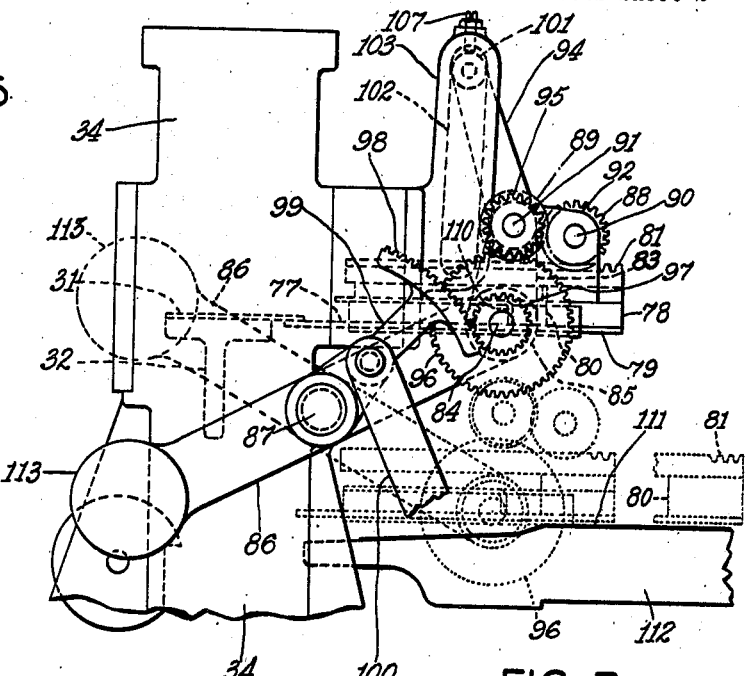
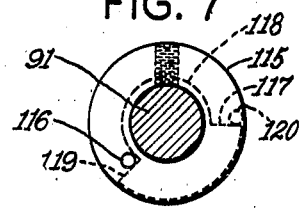
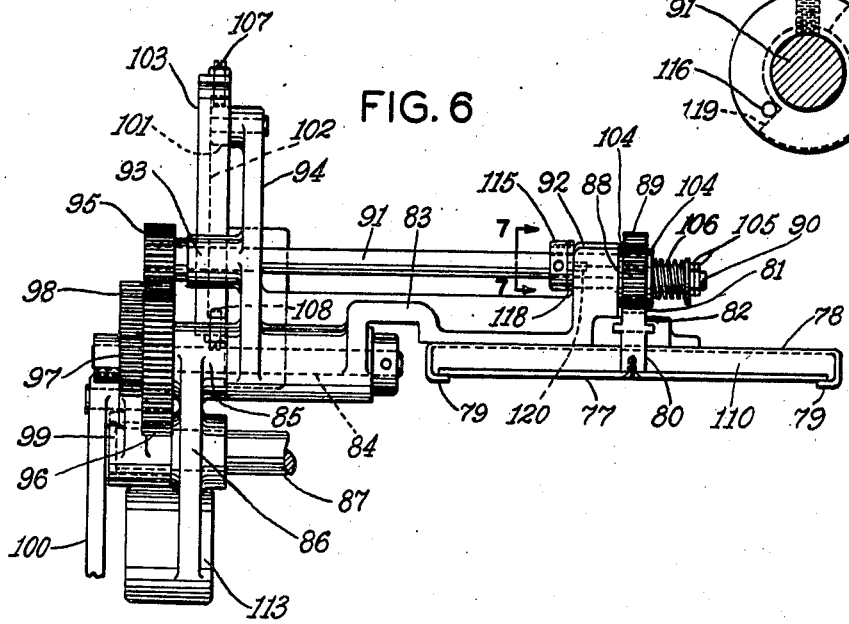
INVENTOR
JOHN F. HALSTEAD
BY
ATTORNEY March 14, 1944.   J. F. HALSTEAD   2,343,902
METHOD OF MAKING CIGARS
Original Filed Oct. 27, 1938   5 Sheets-Sheet 3
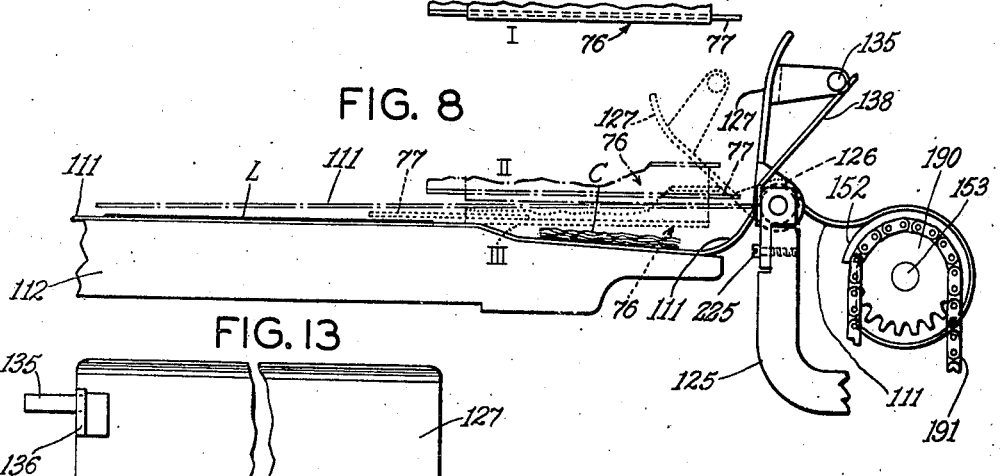
FIG. 8
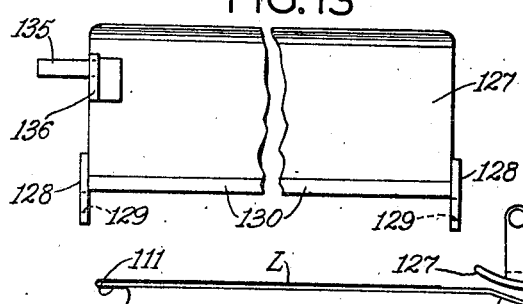
FIG. 13
FIG. 9
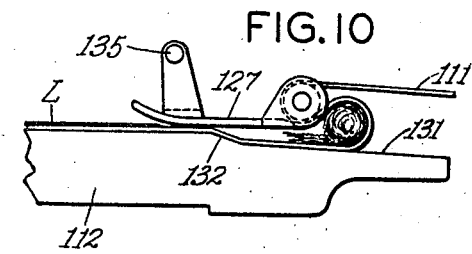
FIG. 10    FIG. 11
FIG. 19
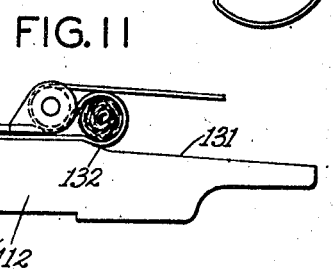
FIG. 12
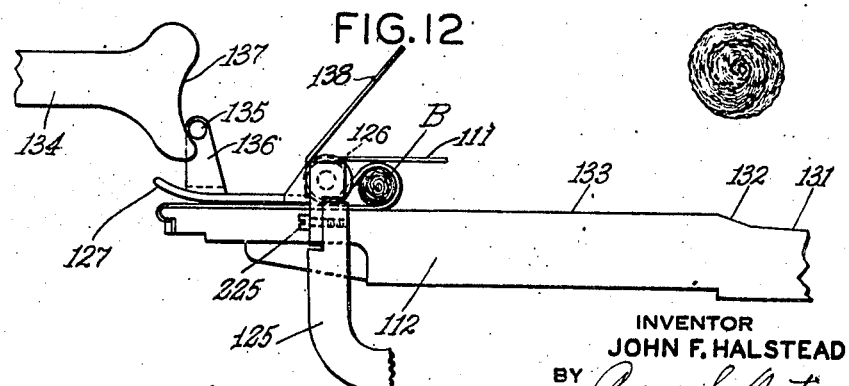
INVENTOR
JOHN F. HALSTEAD
BY George S. Hastings
ATTORNEY March 14, 1944.  J. F. HALSTEAD  2,343,902
METHOD OF MAKING CIGARS
Original Filed Oct. 27, 1938  5 Sheets-Sheet 4
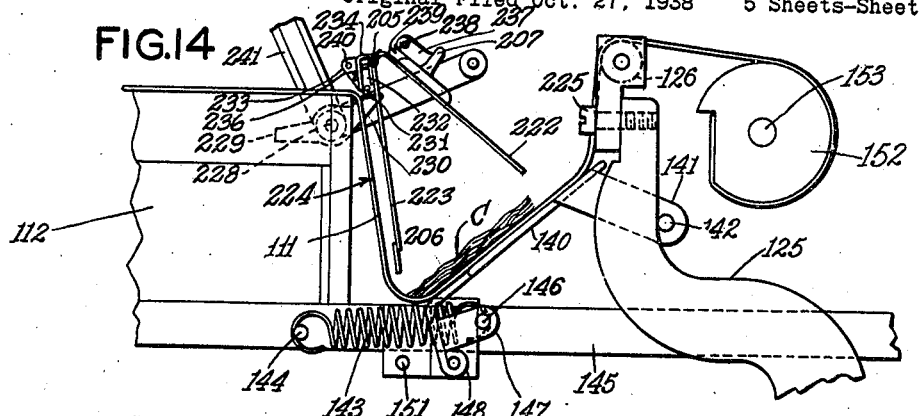
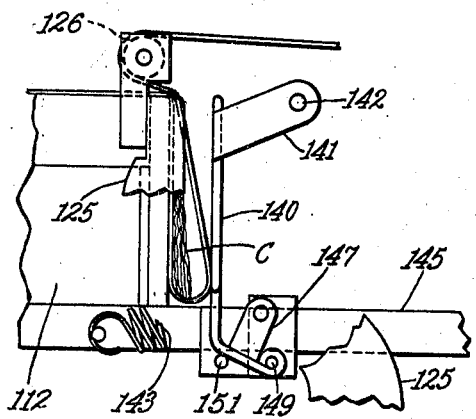
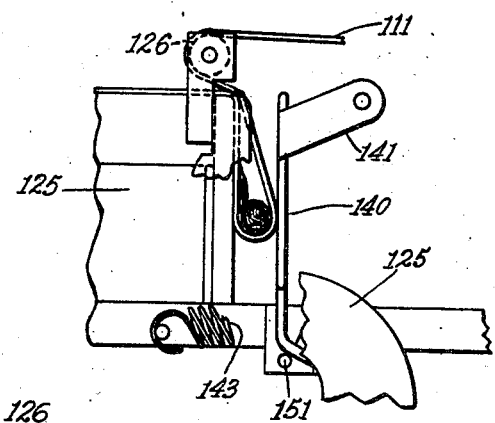
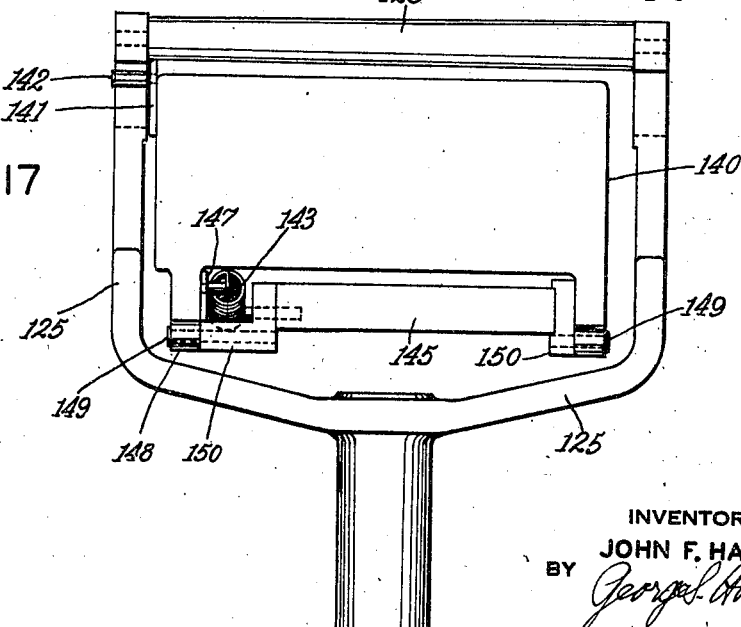
INVENTOR
JOHN F. HALSTEAD
BY *George S. Hastings*
ATTORNEY March 14, 1944. J. F. HALSTEAD 2,343,902
METHOD OF MAKING CIGARS
Original Filed Oct. 27, 1938 5 Sheets-Sheet 5

INVENTOR
JOHN F. HALSTEAD
BY George S. Hastings
ATTORNEY

Patented Mar. 14, 1944

2,343,902

UNITED STATES PATENT OFFICE 2,343,902

METHOD OF MAKING CIGARS

John F. Halstead, Brooklyn, N. Y., assignor to International Cigar Machinery Company, a corporation of New Jersey Original application October 27, 1938, Serial No. 237,254. Divided and this application July 23, 1941, Serial No. 403,637

11 Claims. (Cl. 131—21)

This invention relates to the manufacture of cigars and more particularly to an improved method of forming cigar bunches and constitutes a division of my co-pending application, Serial No. 237,254 filed October 27, 1938, for Charge separating and rolling means for cigar bunch machines, now Patent No. 2,255,740 granted September 9, 1941.

Accordingly it is an object of my invention to produce cigars which will be more uniform in cross section and hence will burn square by substantially eliminating the formation of bunches having flat portions or similar undesirable imperfections which are generally caused by cutting relatively narrow and thick charges from a stream of edge to edge abutting bunch length sections. In cutting at right angles to the stream of tobacco, the bunch charges thus formed may have hard, longitudinal edges which may still retain this unwanted characteristic as a "flat" portion in the finished bunch and cigar. According to my invention, however, all bunch length sections of tobacco are placed in a vertical magazine and compose therein a column of superposed or laminated sections, each section maintaining its individual characteristics in the column, especially insofar as the longitudinal edge portions are concerned. In separating bunch charges of tobacco from this column, a device is provided which moves parallel to the laminations in the column and separates therefrom thin flat bunch charges or layers substantially equal in width to the bunch sections originally fed to the column so that the edges of bunch charges thus formed will always be soft, and, therefore, can never transport into a finished bunch anything approximating a "hard" portion generally encountered in bunches formed by charges produced in other ways, such as mentioned above.

In the production of bunch charges, according to this invention, therefore, a minimum of cutting results from the novel manner in which the tobacco is handled. This is due to the fact that the cutting device moves in a plane parallel to the laminations of tobacco in the column, and in effect separates one layer from the column while merely cutting those portions of tobacco which tend to obstruct the forward movement of the separating device. It is an added object of this invention to provide a method for forming more perfect bunches by the provision of means which retain the original characteristics of bunch sections substantially as originally cut and fed to the storage magazine and provide means for separating bunch charges from the magazine with a minimum of cutting.

It is a further object of my invention to form a vertical column of laminated bunch lengths of tobacco, separate bunch charges in the form of substantially thin flat layers, and deliver successive layers to a transfer member which moves to a bunch rolling unit where each charge is delivered to, and deposited upon the Chianti belt thereof as an entirety in substantially the same condition as when cut from the column, and thereby form charges which when rolled into bunches will be substantially free of flat portions and other unwanted imperfections.

According to my invention, the thin flat bunch charges composed of superposed leaves and pieces of tobacco transferred to the Chianti belt, are disposed thereon in flat condition, and in such form each charge is rolled upon itself somewhat in a manner similar to that employed in rolling up a carpet, so that instead of forcing the pieces of tobacco together to form a bunch, as has been customary in the past, the layer is spirally rolled upon itself and thus converted into a superior type of bunch. It is an added object, therefore, to provide an improved method of forming cigar bunches wherein tobacco of the charge is rolled upon itself in spiral form to make a bunch.

According to the present invention, the bunch rolling operation is divided into several phases. The flat charge after being positioned upon a rolling apron is first rolled or spiralled upon itself to form a loose bunch like article. Following this, the rolling belt is tensioned to restrict the loose bunch peripherally and reduce it to a diameter approximating the finished bunch. The next stage consists in the application of a binder to the constricted tobacco roll and its discharge from the rolling table as a raw bunch. My novel method of forming a cigar bunch, therefore, relates somewhat generally to that for making a so-called "Spanish" bunch, but differs therefrom in several fundamentals due chiefly to the fact that the "Spanish" bunch is tightly rolled from a plurality of overlapped leaves, an operation which causes the tobacco leaves to tightly grip one another and results in "plugging" or a cutting down of the air passages through the cigar.

According to my method described hereinbefore, the several steps employed result in the provision of adequate longitudinal smoke passages which contribute greatly to the quality of cigars made in this manner, the bunch will always be uniform, and ordinary long filler leaves may be used in forming the flat charges. Cigars made in this manner will burn square because the air passages are more uniformly distributed over the whole area of the cigar cross section. This invention, therefore, consists also in a novel method for making cigars wherein a layer of superposed pieces of tobacco constituting a bunch charge is rolled upon itself into loose bunch form and then constricted peripherally to a given diameter prior to its envelopment in a binder.

The invention also consists in the improved method of rolling a thin layer of filler tobacco upon itself into bunch form and maintaining each charge or layer substantially flat in order that it may be spiralled upon its delivery to the rolling mechanism. In order to achieve this object, mechanism is provided wherein the rolling pin unit has associated therewith a member functioning to hold a charge in relatively flat condition upon the rolling belt during the progressive stages of the rolling operation, and means are also provided for controlling the tension of the rolling belt at a predetermined time to constrict the loose tobacco roll peripherally and reduce its diameter to a predetermined size.

In the formation of bunch length sections, it is customary to feed tobacco to a device which delivers a continuous stream of tobacco to a cutter operating cyclically to cut bunch length sections therefrom. Since the tobacco is generally fed into the feed device manually, it is practically impossible to insure that the cross section of the stream will be constant, and hence it has been found in many instances that the edges thereof taper off generally from the center, with the result that the center of the stream is higher than at the edges. From this it follows that when a plurality of sections are placed in a magazine to form a vertical laminated column of lengths therein, there is a possibility that the edge portions thereof may not be as dense as the center. In order to compensate for this defect in the feeding of tobacco, I have provided a member having attached thereto upon its tobacco engaging face a compressible material which when brought into engagement with the top of the column, will compress the tobacco thereof also around the edges, and thereby provide a cross section of substantially uniform density of tobacco at the bottom of the column or adjacent the supporting plate and at the line where a charge is separated from the column, and thereby considerably reduce the number of voids. The pressure around the edges also holds the tobacco firmly during the cutting operation, and thereby prevents pieces of tobacco from being torn loose and separated from the shaped ends of the charge. In order to insure against relatively large variations in the density of successive charges cut from the column, mechanism is provided for determining the density of a prospective charge before it has been separated from the column, and set into motion means for compensating for any lack of tobacco in the proposed charge by automatically effecting the feed of more or less tobacco to the charge separating devices.

With these and other objects not specifically mentioned in view, the invention consists in certain features which will be hereinafter fully described, and then specifically set forth in the claims hereunto appended.

In the accompanying drawings, which form a part of this specification, and in which like characters of reference indicate the same or like parts:

Figure 1 is an end view of the filler magazine, partially in section, showing mechanism for separating thin charges from the filler supply;

Figure 2 is a side view of Figure 1, and, in addition shows the slide and slide bracket of the filler supply chamber;

Figure 3 is a sectional plan view of a portion of Figure 2;

Figure 4 is a side elevation in detail of a portion of the plate elevating mechanism;

Figure 5 is an end view of an improved transfer which receives a thin severed charge from the filler supply and delivers it to the rolling means of the machine;

Figure 6 is a front view of Figure 5;

Figure 7 is a sectional end view taken on line 7—7 of Figure 6;

Figures 18, 20:
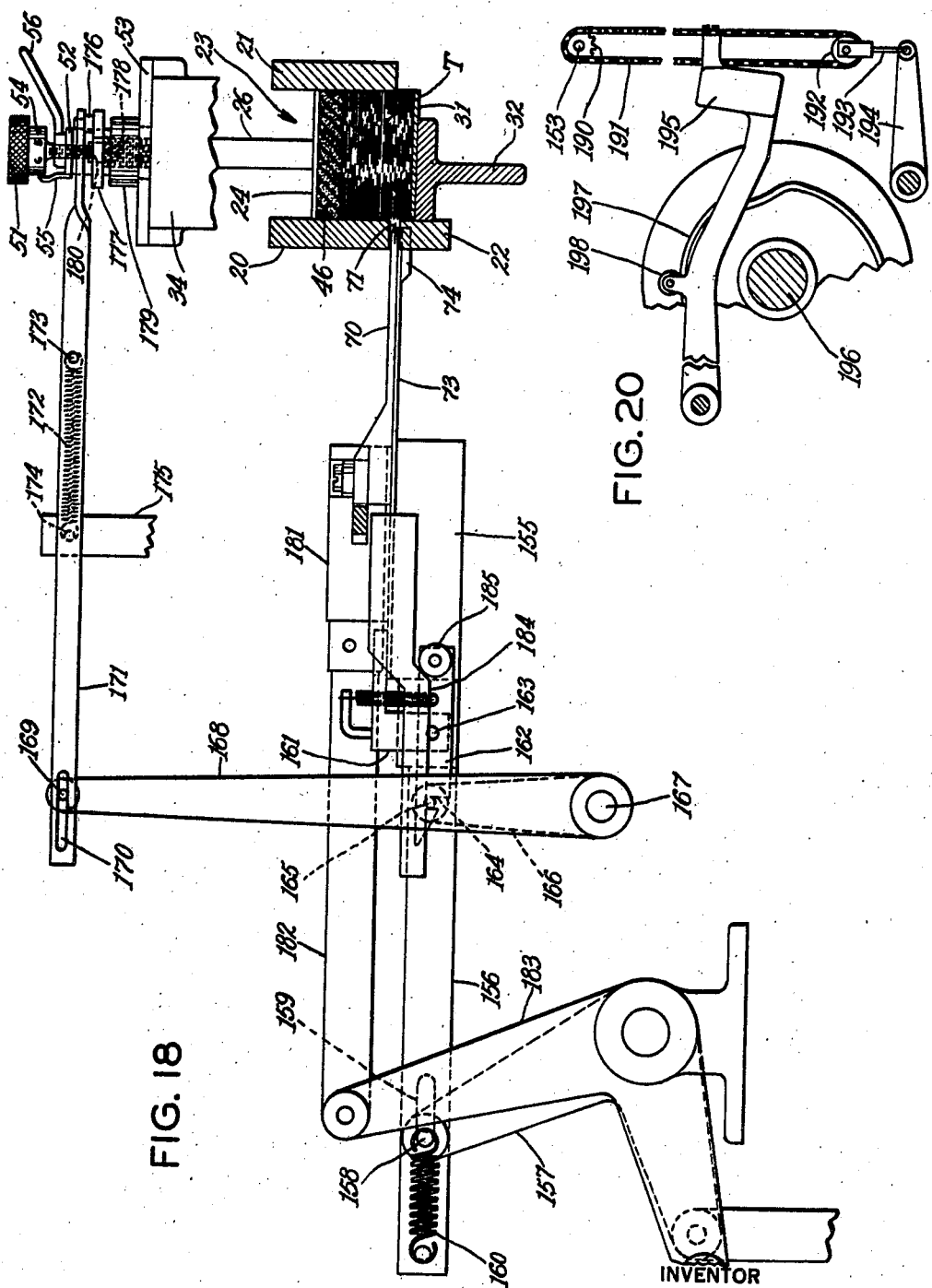

Figures 8 to 12, inclusive, are end views showing the successive steps in rolling the bunch;

Figure 13 is a plan view of a pressure plate used in conjunction with the rolling means;

Figures 14, 15 and 16 are end views, disclosing a modified form for rolling the bunches;

Figure 17 is a front view of the mechanism shown in Figures 14, 15 and 16;

Figure 18 shows a modified charge forming mechanism having means for automatically regulating the thickness of the bunch charges;

Figure 19 is a cross sectional view showing the form a bunch charge assumes after being spiralled upon itself at the completion of the first stage of the rolling operation; and Figure 20 is a detail showing the mechanism for operating the bunch rolling apron.

Referring to the drawings, the plates 20, 21 and 22 (Figure 1) which constitute the side walls of a vertical filler supply magazine, designated generally 23, are placed and supported in the same manner as in my co-pending application, Serial No. 117,180 filed December 22, 1936, for Cigar machine, now Patent No. 2,255,054, granted September 9, 1941. A pressure plate 24 secured at 25 to a slide 26 mounted in a runway 27 of bracket 28 and retained by a plate 29 attached thereto by screws 30, is operated to compress and guide the filler tobacco supply held in the magazine 23 by a bottom plate 31. The bracket 28 is secured to the side of plate 21 and furnishes a bearing for a shaft (not shown) upon which is fixed a lever having connections to slide 26 in a manner similar to that shown in my above mentioned Patent No. 2,255,054. The other end of this shaft is connected to the well-known cross feed control mechanism, also disclosed in the above mentioned Patent No. 2,255,054, which will prevent additional filler tobacco from being fed whenever a predetermined surplus exists in the magazine 23. The magazine bottom plate 31 is attached to a bracket 32 projecting from a slide 33 arranged for vertical travel in a bracket 34 suitably attached to the frame of the machine. Slide 33 is provided with a plurality of rollers 35 which engage in tracks 36 of bracket 34, and in this manner insures the free movement of the slide as it reciprocates vertically under the influence of a cam actuated link 37 engaging a stud 38 mounted on slide 33 and guided in a slot 39 in link 37.

In the illustrated embodiment the filler tobacco T is fed in a continuous stream onto a movable platform 40, when the platform is located in a horizontal plane or in its receiving position. After a predetermined length of tobacco has been fed upon the platform, a corrugated cutter (not shown) coacting with similar corrugations in platform 40, cuts a bunch length from the stream. The feeding and cutting mechanism may be similar to that shown in my above identified Patent No. 2,255,054. Following the severance of a bunch length from the stream, platform 40 is lowered to a position where the length can be removed therefrom and placed in the vertical magazine 23.

The platform 40 is fixed to an arm 41 which is raised and lowered by means of a link 42 connected to a suitable cam (not shown). When platform 40 is in its inclined or discharge position, its foremost edge rests upon a horizontal gate 43. This gate is mounted for reciprocatory movement, and during the feed of tobacco to the magazine closes the opening by being projected over the space between the walls 20 and 21. Bunch lengths of tobacco resting upon platform 40 are discharged therefrom onto gate 43 by means of a rake 44, provided with a plate 45 adapted to engage the rear edge of each bunch length and sweep it from the platform in the manner described. Plate 45 which is mounted upon rake 44 in any suitable manner is preferably bevelled at its bottom edge for more effective cooperation with platform 40 and gate 24. Rake 44 moves the cut filler length over gate 43 until it is positioned between the wall plates 20 and 21 directly above the vertical column of tobacco in the magazine.

When a filler section or severed bunch length T has been positioned by plate 45 on gate 43 over the tobacco in the magazine 23, the rake 44 occupies the position shown in dot-dash lines in Figure 1 with plate 45 aligned with wall 20. Plunger 24 is moved downwardly on its slide 26, and the resilient pad 46 carried by the plate 24, descends, and bears against the filler section T supported on gate 43. Simultaneously with the downward movement of plate 24, link member 37 is raised thereby allowing slide member 33 to travel upwardly with the result that tobacco in the magazine is pressed against the underside of the gate 43. The gate is then retracted and the tobacco charge thereon moves into the magazine and forms an added lamination in the column of tobacco. In this manner additional charges are fed into the magazine once each cycle of the machine, and the vertical column is maintained therein as a plurality of laminated layers ready for the separation of successive bunch charges therefrom.

The pressure plate 24 is provided on its tobacco contacting face with a resilient pad 46 and whenever high spots or other inequalities appear in the column of tobacco, the pad will yield at these places and yet exert pressure upon the lower or softer portions thereof in order to press the tobacco carried by the bottom plate 31 to a practically uniform density over the whole area of the charge to be cut off. A uniform density of the charge is necessary in order to produce a bunch having the smallest possible variation in weight. The pad 46, which is preferably made of sponge rubber, or other suitable compressible material, also acts to hold the cut ends of the charge together firmly during the separation of bunch charges from the column, and hence prevents these ends from being broken off during this operation.

In order to prevent damage to the pad 46 carried by plate 24 due to inadvertent engagement of the knife 71, hereinafter described, when the tobacco in the magazine is low or has been exhausted, the cam and lever connections (not shown) normally utilized in reciprocating to raise and lower plate 24, are set to control the downward limit of movement of the plate and pad. In order to further insure that no damage will come to the pad, at any time during the operation of the machine, there has also been provided a pin 226 mounted upon slide 26, which pin is adapted to engage an adjustable set screw 227 mounted upon bracket 28. The set screw is so adjusted that pad 46 will always come to rest above the separating plate 70 and knife 71, regardless of the position of the cam lever and cam which control the reciprocation of slide 26. The above described arrangement of pin 226 and set screw 227 also furnishes a visual guide for an operator to show the height of tobacco in the column because when the pin 226 rests upon set screw 227, it is an indication that either the tobacco in the column is very low or exhausted.

A slide block 47 (Figures 2 and 4) is notched at one end to fit the stud 38 and is fitted to the slot of the link 37 where a spring 48, placed on a stud 49, secured to the other end of the block 47 and passing through the top of the link 37 yieldingly holds it in a position limited by nuts 50 on the stud 49. This feature, in cooperation with an improved stop arrangement to be described, provided for adjustment for different thicknesses of charges.

When a charge is to be separated, the column of tobacco in the magazine, held in compression between pressure plate 24 and magazine bottom plate 31, is moved downwardly by cam actuated links, referred to hereinbefore, with the column of tobacco held therebetween into charge separating position and an adjustable screw 51, carried by a holder 52 secured to the slide 33, in any suitable manner, engages a plate 53 attached to the upper end of bracket 34 and stops further descent of the slide 33 and the bottom plate 31. The sliding block 47, previously described as fitted to slot 39 of the link 37 and yieldingly held in position by the spring 48, will compress the spring 48 by the additional travel of the link 37 since the magazine bottom plate 31 and slide member 33 have come to rest, as described. Screw 51 is provided with a graduated barrel 54 which, together with a pointer 55, attached to holder 52, permits the operator of the machine to readily determine the amount of adjustment given screw 51. The turning of screw 51 regulates the thickness of the charge to be separated and when correctly set, it is locked in place by a nut 56.

The upward movement of slide 33 is controlled by a sliding block 57 also fitted in slot 39 of link 37, this block being notched at one end to fit stud 38 carried by slide 33 and is yieldingly held against the same by springs 58 stretched between studs 59 of link 37 and studs 60 of the slide block 57. Block 57 is attached to a cover or plate 61 by screws 62 passing through elongated slots 63 provided in the plate 61, thereby permitting adjustment of block 57. The link 37 is also provided with pins 64 which engage and stop the upward movement of plate 61, and block 57 and thereby prevents the pull of springs 58 from compressing the spring 48 of the sliding block 47. The link 37 in ascending causes block 57 to raise stud 38 and its slide 33 until the surplus tobacco on the magazine bottom plate 31 encounters the gate 43 which is then in a position across the support plates 20 and 21 of the magazine 23. It is understood, as previously related, that the gate 43 in this position supports the filler section delivered by the swinging rake 44, which section at this time is subjected to the compressing action of plunger 24. The column of tobacco supported on plate 31 engages the underside of gate 43 and stalls the upward travel of slide 33 and block 57 and actuator stud 38 whereby the link 37 will continue to ascend idle, and lift block 47 from stud 38. The idle travel of the link 37 stretches the springs 58, which in turn, when the link retreats, aid in returning the block 47 against stud 38 and cause the slide 33 to descend as heretofore described.

When the filler supply is in position, a separating plate 70 and a knife 71, which is supported by bracket arms 72 (Figure 2), move into engagement and separate a thin charge from the filler supply. The separating plate 70, preferably, is tapered at its advancing edge in order to facilitate the cleavage of the charge from the column of compacted tobacco retained within the magazine 23, as it follows the knife blade 71 which oscillates rapidly in a slot formed in the advancing edge of the plate. This knife, therefore, only cuts the upturned stems or other leaf obstructions which are not substantially parallel as a part of the laminated tobacco column. It is to be observed that substantially the full width of the large bunch length sections, as originally cut from the tobacco stream fed to the machine, has been retained even though the several lengths have been converted into a vertical column of tobacco, because there has been no additional cutting at right angles to the level of the leaves in the column, since the leaf sections were cut from the stream; hence in the formation of bunch charges I have practically eliminated the presence of short particles or pieces of tobacco commonly known as "slivers and strings" which are often formed in the production of bunch charges wherein there are several cutting operations. Since the remainder of the charge separating and operating mechanism therefor consists of substantially the same parts as in my Patent No. 2,255,054, I have omitted any further showing of the same in the present case.

When a thin charge has been saparted from the column of tobacco, a plunger 74 mounted on plate 73, travels between the separating plate 70 and the magazine bottom plate 31 to force the separated thin charge into a pocket 75 of a transfer device indicated generally at 76 (Figure 1). After loading the transfer device, the plunger plate 73 and plunger 74 are retracted and the magazine bottom plate 31 is elevated to a suitable distance from the separating plate 70 so that the remaining filler supply will be supported after the separating mechanism is retracted.

In the operation of the machine there is generally a column of tobacco in the magazine as long as tobacco is being fed from the feeding mechanism upon platform 40 and conveyed to the magazine. However, whenever the feed of tobacco to the magazine ceases, the machine continues to operate and in this manner, bunch charges are removed from the magazine until all the tobacco forming the column of tobacco has been formed into charges and ejected from the magazine. It will be seen, therefore, that there is no danger of any tobacco remaining in the column at the close of a day's run, and that when the machine is again operated to make cigars, the vertical column of tobacco in the magazine will be formed of fresh tobacco.

The transfer device, Figures 1, 5 and 6, consists of a sliding bottom plate 77 and a rectangular U shaped chamber 78 which, together form the pocket 75. Member 78 includes extending side shelf portions 79 along which the bottom plate 77 slides. This plate is secured to a portion 80 of a rack 81 guided in a slot 82 of a swinging bracket 83 mounted on a shaft 84 supported in a hub 85 of an arm 86 pivoted on a shaft 87 fixed in the slide bracket 34. The rack is operated by a gear 88 in mesh with a gear 89. Gear 88 is mounted on a stud 90 and gear 89 is mounted at one end of a shaft 91, both of which are supported in a lug 92 of bracket 83. The other end of shaft 91, which is supported in a central hub 93 of an arm 94, forming a part of bracket 83, carries a gear 95 which meshes with a gear 96 on shaft 84. A gear 97, secured to gear 96, is driven by means of a segment 98, which is part of an arm 99 pivoted on shaft 87, the arm 99 being connected by a link 100 to a cam (not shown) which imparts motion to the segment 98 and its coacting gears.

Arm 94 of bracket 83, at its upper end is equipped with a roller 101 adapted to engage in a track 102 of a bracket 103 supported by slide bracket 34. The track 102 guides the entire transfer device in its up and down travel from its full line position to a position shown in dotted lines (Figure 5). It will be noted from a reference to Figure 5 that the transfer pocket is maintained in a substantially horizontal position when bunch charges cut from the vertical column of tobacco in magazine 23 are pushed therein by pusher 74, and that the pocket is held in a horizontal position at the conclusion of its travel from the receiving to the delivery station where a charge is deposited upon the Chianti belt 111. During the ascent or descent of the transfer device, the open or closed position of the bottom plate 77 is maintained by means of the gearing heretofore described and is held from moving by means of frictional washers 104 such as made from fiber or other suitable material (Figure 6), placed at each side of the gear 88 on stud 90. This stud is also provided with lock nuts 105 which permit means for tensioning a spring 106 bearing against one face of fiber washer 104 as shown in Figure 6, so as to hold the gearing inactive until roller 101 engages the top screw 107 or bottom screw 108 at which time the link 100 overcomes the frictional mechanism of gear 88 and permits the segment 98 to turn gear 97 whereby motion is transmitted to gear 88 thereby operating rack 81 and bottom plate 77 attached thereto either to open or close the charge transfer pocket depending upon the position of arm 94.

When the roller 101 carried by arm 94 engages said screw 108, the transfer device 76 has reached its lowermost position after a vertical translation with a substantially parallel motion and sides 79 rest upon belt 111 as shown in dotted lines in Figure 5. Although the downward movement of the transfer pocket has ceased, the continued oscillation of gear sector 98 is responsible for the reciprocation of plate 77 relative to the upper member 78 of the transfer 76 and the plate moves to the right as shown in Figures 1 and 5. This travel of plate 77 causes the thin charge located within pocket 75 to stop against a vertical wall 110 forming the back of member 78, and the continued movement of plate 77 eventually allows the charge to be deposited and substantially intact upon a rolling apron 111 overlying a rolling table 112 of the machine. The charge thus deposited on the rolling apron 111, the transfer device is lifted to its up-position by link 100 with the aid of a counterbalance 113 on arm 86, the gearing

107. The transfer device is constrained to move in a path rearwardly and upwardly and therefore does not disturb the charge by its movement. This engagement permits the additional travel of link 100 to overcome the tension of the frictional holding means of the gearing and return the rack 81 and its plate 77 to their original position in readiness to receive the next charge.

The screw 107 provides means for adjusting the position of plate 77 with plate 31 and screw 108 provides means for adjusting the position of the transfer device in respect to the rolling table 112.

A collar 115 fastened to shaft 91 (Figures 6 and 7) is provided with a pin 116 adapted to engage an extending step 117 of a floating washer 118 on shaft 91. It is seen, that as the shaft revolves, the pin 116 will advance and engage step 117 and turn washer 118, thereby advancing its other stepped portion 119 towards a stationary pin 120 in lug 92. This feature prevents the rack 81 from being accidentally pulled out of engagement with its gear, as any additional travel of the rack will turn shaft 91 and cause step 119 of the floating washer to engage stop pin 120 whereby the rotation of shaft 91 will be stopped as pin 116 engages step 117.

With the separated thin flat charge C in place on the rolling apron 111 (Figure 8), bracket 125, which may be similar in construction to that shown in my Patent No. 2,255,054, of the rolling means, advances its rolling pin 126, and a plate 127 movably mounted on the bracket, which in being forwarded descends and engages the charge C. Plate 127, as shown in Figures 9 and 13, is provided with bearings 128 having holes 129 to fit loosely on the ends of the rolling pin, the plate 127 being beveled at 130 in order to fit closely to the rolling apron portion passing around its pin. Figure 8 illustrates the transfer 76 in its movement from position I above the upper edge of plate 127 to position II where it presses downwardly upon the tensioned belt 111 which is held with a snubbing action by rolling pin 126 and plate 127 to position III shown in dotted lines where a charge C is deposited on the apron. During this downward movement, transfer 76 will interfere with the downward swinging movement of plate 127 which will take place as the transfer engages the belt 111 which shifts from the tensioned position shown in dotted lines to the relaxed position shown in full lines, wherein transfer 76 is shown in dotted lines with the charge supporting plate 77 of the transfer 76 retracted for depositing the charge on the apron 111 and with plate 127 resting against the transfer. Immediately upon the transfer moving upward from position III to position I past the upper edge of plate 127, the inclined position of a portion of belt 111 and gravity tend to cause the plate 127 to assume the position shown in Figure 9. The dotted outline of transfer 76 and plate 127 in Figure 8, indicate the manner in which the transfer prevents downward swinging movement of plate 127. The forward travel of the rolling pin 126 loosens the apron further and allows the plate 127 to fall flat by gravity upon charge C resting on the apron overlying the depressed portion 131 of the rolling table 112. The advance of the rolling pin to a position shown in Figure 9 causes the forward end of the flat charge C to be rolled by the loop of the apron, and as a result, the loop of the apron first rolls up the charge from its forward edge while the remainder of the charge is held flat by plate 127.

Thus, as the rolling pin 126 advances towards the position shown in Figure 10, the flat charge is rolled upon itself from one edge to the other somewhat as a carpet is rolled up, producing a loose, naturally round bunch without any crevices, joints or "flats" such as may often result from rolling a thick and narrow charge. In approaching the position shown in Figure 11, the layer has been completely rolled into loose bunch form. In Figure 19 there is shown approximately the form a thin flat charge assumes at the conclusion of the initial rolling operation. When the apron has rolled up and passed the inclined portion 132, the rolled charge travels over the flat surface of the table 133 whereupon after a short travel the apron is tightened, by means hereinafter described, to compress the charge and constrict it peripherally to the desired diameter. In the further movement over the flat surface 133 of the table, a binder leaf L, previously placed on the apron and held in position by suction, by means well known in the art, is wound about the charges and forms a cigar bunch B of desired size as shown in Figure 12.

The plate 127, in approaching the rear end of the rolling table 112 is lifted from apron 111 by means of a cam piece 134 which engages a stud 135 projecting from a bracket 136 secured to plate 127. Member 134, which is suitably mounted on the machine frame, is provided with a curved surface 137 which gradually lifts stud 135 and consequently plate 127, as it is being advanced, and returns the stud to its initial position against the stop 138 (Figure 8) which holds the plate 127 in substantial vertical position.

In order to properly control the movement of the apron 111, one end thereof is secured about roller 152 mounted on shaft 153 suitably supported in the machine in a manner well known in the art. Fixed to the shaft 153 is a sprocket 190 about which tracks a sprocket chain 191 trained around the bottom roller 192 fixed in a journal secured to a chain tightener 193 connected to a chain tightener arm 194 pivotally mounted in the machine. In order to tension or loosen the rolling apron 111 at the desired time during the operation of the machine, a lever 195 pivotally mounted in a manner similar to that shown in Patent No. 1,442,200 issued January 16, 1923, to V. J. Wahlstrom and provided with a cam follower 198 tracks a cam 197 fixed to cam shaft 196 of the machine. The rolled bunch B upon reaching the desired end of table 112 may either be taken from the apron or it may be delivered by suitable means to a transfer unit of the machine (not shown). The bracket 125 is then restricted and returns the rolling pin 126 and plate 127 to the starting position in readiness for rolling the next charge.

Referring to Figures 14 to 17, which discloses a modified method of rolling a bunch, the charge C is placed, by suitable means such as a device of the type shown in my Patent No. 2,255,054, hereinabove referred to, upon the inclined portion of the rolling apron 111 overlying a plate 140. This may take the form of relatively separable members of a swinging transfer device 224 comprising plates 222 and 223 hinged together at 205 and held open to receive tobacco charges by the engagement of the magazine bottom plate 31 with an edge 206 formed on plate 223. Plate 222 is suitably secured to a bracket 207 fixed on a shaft 228 which carries two arms 229, 230 to coact with a pin 231 mounted on a block 232. The block 232, one part of which is up-turned at 234 is attached to the plate 223 at 236. A lug 237 on bracket 207 carries a pin 238 from which a spring 239 is attached to a pin 240 on a lug formed on a plate 234, which spring normally tends to draw plate 223 towards plate 222 into layer holding position. A slotted cam arm 241 integral with the bracket 207 is operated by suitable means (not shown) to move bracket 207 relative to arms 229 and 230 so that as the movement of the slotted arms turns the bracket 207 about its pivot shaft 228, the transfer plates 222 and 223 will be opened to discharge a charge of tobacco C onto the apron (as shown in Figure 14) and then closed by engagement of arm 229 with pin 231. Plate 140, at its upper end, is provided with an extending lug 141 having a pin 142 which is normally held against bracket 125 by a tension spring 143. This spring is stretched between a post 144 in a bar 145, of the machine and a post 146 carried by an extending lug 147 located at the lower portion of the plate 140. The lower end of plate 140 terminates in a loop 148 which provides means for loosely mounting it on studs 149 supported in blocks 150 secured to bar 145. It is seen that as bracket 125 advances, the spring 143 will pull plate 140 to a vertical position (Figure 15) stopping against a stud 151, in this latter position a loop being formed for the rolling apron 111. The tightening of apron 111 by roller 152 causes the looped portion of the apron to ascend in the space between plate 140 and the forward end of table 112 and in so doing, it starts to roll the flat charge C as seen in Figure 16. The further advance of the bracket 125 brings the charge into contact with a binder leaf which is wound around the charge producing a bunch of the desired size.

In placing the filler tobacco progressively into the belt formed channel of a filler feed mechanism of a type such as that shown in Patent No. 1,740,571 granted December 24, 1929 to W. B. Bronander, known in the art, in most cases the leaves tend to build up in the center of the channel, laterally, resulting in a tapering of the stream of leaves towards the side walls because of the general irregular shape of the leaves. When this tobacco column is severed by a corrugated cutter mechanism which may be of the type disclosed in the Bronander patent referred to, but not shown herein, and delivered by means, heretofore described and shown, into the magazine 23, it rests on top of the filler tobacco T previously delivered. When the tobacco stored in the magazine is acted upon by the compressor pad 46, this resilient pad tends to yield to the high portions of the tobacco and will exert pressure at the lower and softer portions so as to press the tobacco against the magazine plate to a more or less uniform density over the area of the charge to be cut off. It should be remembered that as the filler tobacco builds up in the magazine 23 in substantial laminations due to the manner in which tobacco is fed thereto, and since most of the charges delivered, are more or less tapered in cross section, the central portion of the stored tobacco may be more dense than the parts adjacent the side walls 20 and 21, and for this reason even though the pad 46 yields to high portions there is a limit to the give of the pad at which time the tobacco adjacent the walls will not be fully compressed. If a charge of this kind is severed and separated from the mass of tobacco T in the magazine and later is rolled up to form a cigar, there may be quite a difference in the weight of this particular cigar from one rolled when the charge is practically uniform in density. To overcome this inconsistency in the density of the filler column and also the resultant difference in weight of the finished cigars, the plunger 74 in the modified form shown in Figure 18, is employed to perform two duties, first, as a feeler to check the density of the column of tobacco and at the same time set a compensating device, and second, as a pusher to eject the separated thin charge from magazine 23 into the pocket of the transfer device which delivers the tobacco to the rolling means of the machine.

The plunger 74 is carried by the plunger plate 73 secured to a sliding block 155 operated by a link 156 deriving motion from a bell-crank lever 157 having suitable connections to a cam, not shown. The upper end of lever 157 has a stud 158 engaging in a slot 159 of link 156, stud 158 being normally held in the position shown in Figure 18 by a spring 160. When plunger 74 is actuated to feel the lower portion of the filler tobacco, it advances into the tobacco until the density of the same overcomes the tension of spring 160 whereupon any additional travel of the plunger will be stopped as stud 158 will pass freely in the slot 159. When the tobacco is of the desired density, the slot 159 is long enough to take up the travel of stud 158 and the plunger will remain inactive. The block 155 carries a holder 161 supporting a latch 162 loosely mounted on a stud 163, latch 162 having an open slot 164 engaging a pin 165 of an arm 166 mounted on a shaft 167. The movement of block 155 causes latch 162 to swing arm 166 and an arm 168, the latter at its upper end being provided with a stud 169 engaging in an elongated slot 170 of a link 171. Stud 169 is normally held against the end of slot 170 by a spring 172 stretched between a post 173 of the link and a post 174 carried by an upright column 175 secured to the bed of the machine.

The other end of link 171 connects to a stud 176 in an arm 177 which is clamped to the shouldered end of a spindle 178 turning in a threaded hub 179 secured in plate 53. The movement of link 171 causes spindle 178 to turn whereby the magazine bottom plate 31 by means of its connections will, due to the rocking of screw 51, descend, thus increasing the thickness of the thin charge about to be severed and separated from the mass of filler tobacco in magazine 23. The plunger 74 is now retracted to its starting position and in so doing also returns the arms 166 and 168 to their original position. The link 171 retains its position as adjusting screw 51 bears against a fiber insert 180 provided in spindle 178, thus holding spindle 178 from turning and thus stud 169 will pass freely in slot 170.

The knife 71, having suitable connections to its sliding block 181 operated by a link 182 deriving motion from a bell-crank lever 183 connecting to a cam, not shown, now advances and serves a charge from the filler tobacco. The thickness of this charge will depend, therefore, on the automatic setting of spindle 178. Knife 71 is reciprocated continuously by mechanism similar to that shown in my Patent No. 2,255,054. The advance of block 181 causes a cam piece 184, secured to the block, to engage a roller 185 of latch 162, thus depressing the same, causing slot 164 to become disengaged from pin 165 of arm 166. It is seen that as the plunger is advanced to expel the severed charge into the pocket of the transfer means, arms 166 and 168 will remain stationary. With the transfer pocket loaded, the plunger is again retracted to its starting position, and the bottom plate 31 is elevated to a suitable distance from the separating plate 70 so that the remaining filler supply will be supported after the separating mechanism is retracted. The ascent of bottom plate 31 also raises screw 51 from insert 180 whereby the spring 172 returns the link 171 to its original position.

While the preferred embodiment of the invention has been shown and described, it is to be understood that the invention is not confined to the specific method steps and the details of the construction of the apparatus for carrying out the method herein set forth, by way of illustration, as it is apparent that many changes and variations may be made therein, by those skilled in the art, without departing from the spirit of the invention, or exceeding the scope of the appended claims.

What is claimed is:

1. The process of manufacturing cigar bunches comprising, forming substantially thin flat bunch layer charges of tobacco of substantially uniform charge thickness, locating said charges on a table, maintaining said charges in substantially flat condition thereon, rolling a charge thus located and maintained spirally upon itself into loose bunch form while the portion of said charge other than that being rolled is maintained in flat condition on said table, constricting said loose bunch form peripherally to reduce the diameter to substantially that of a finished bunch, and then rolling said constricted bunch in a binder to form a bunch therefrom.

2. In a method of producing a cigar bunch, the steps comprising, forming a thin flat bunch charge of substantially regular dimensions and substantially uniform thickness throughout the length and breadth, completely rolling said charge progressively spirally upon itself from one longitudinal edge toward the other into a loose bunch like article, then constricting said bunch like article over substantially its entire outer surface to decrease its diameter at the conclusion of the rolling operation, and rolling said constricted article in a binder to produce a bunch.

3. In a method of producing cigars, the novel steps comprising, loosely rolling a substantially thin flat layer of substantially uncompressed filler tobacco having a substantially uniform thickness throughout its length and breadth into a bunch like article, maintaining positive control over said layer against substantial displacement of said filler during the rolling operation to effect a spiral rolling of substantially the entire thickness of the layer from one longitudinal edge towards the other upon itself into a loose bunch like article, then constricting said bunch like article peripherally to compact the tobacco forming said bunch like article and thereby reduce its diameter to a predetermined size, and rolling said constricted bunch like article in a binder to form a bunch.

4. In a method of producing cigars, the novel steps of forming a vertical column of tobacco by stacking a plurality of layers of uniform width and length but variable thickness, compressing said tobacco to a predetermined density to cause any variations in thickness of said layers to be averaged out, separating a succession of bunch charges from an end of said column in the form of uniform relatively thin flat charges, transferring said charges in succession to a rolling surface, maintaining each charge in substantially flat condition on said surface, loosely rolling each charge spirally upon itself into bunch like form, constricting each bunch like form peripherally and then applying a binder thereto to form a bunch.

5. In a method of producing cigars, the novel steps which include cutting a succession of bunch charges which may vary in thickness from an endless stream of tobacco, bringing said charges into laminated relationship by positioning the bottom of one charge against the top of another, applying resilient pressure to said superimposed charges of tobacco to form a column of tobacco wherein any variations in thickness of said layers are averaged out, separating thin bunch charges of substantially uniform length, width and density, transferring said charges in succession to a rolling surface, loosely rolling each charge spirally upon itself in bunch like form, constricting each bunch like form peripherally to reduce the same to a predetermined diameter, and then rolling said constricted bunch like form in a binder to form a bunch.

6. In a method of producing a cigar bunch, the steps which comprise forming a thin flat bunch charge of substantially regular dimensions and of substantially uniform thickness, positioning said bunch charge on a rolling surface, applying a charge holding element to a part of said charge to maintain said charge properly positioned on said surface for progressive rolling of said charge, and while said charge is so maintained moving said element relative to said charge to expose unrolled portions thereof and completely rolling said charge spirally upon itself from one longitudinal edge toward the other as said portions are exposed into a loose bunch like article.

7. In a method of producing a cigar bunch, the steps which comprise forming a thin flat bunch charge of substantially regular dimensions, positioning said bunch charge on a rolling surface, applying a charge holding element to a part of said charge to maintain said charge properly positioned on said surface while exposing a longitudinal end portion for initial rolling, and while said charge is so maintained moving said element relative to said charge to progressively expose additional unrolled portions thereof and thereby completely rolling said charge spirally upon itself from one longitudinal edge towards the other as said portions are progressively exposed into a loose bunch like article, constricting said bunch like article over a major portion of its outer surface to reduce said article to a predetermined diameter and then rolling said constricted article in a binder to form a bunch.

8. In a method of producing cigars, the novel steps of forming a vertical column of tobacco by superimposing a plurality of layers of substantially uniform width and length but variable thickness, compressing said tobacco to a predetermined density to cause any variations in thickness of said layers to be averaged out, determining the volume of each bunch charge to be separated from said column and adjusting each quantity of tobacco immediately available for charge formation to produce substantially uniform charges, then separating a bunch charge from an end of said column in the form of a substantially uniform thin flat charge, transferring said charge to a rolling surface and rolling said charge into a bunch.

9. In a method of producing cigars, the novel steps of forming a vertical column of tobacco by superimposing a plurality of layers of substantially uniform width and length but variable thickness, compressing said tobacco to a predetermined density to cause any variations in thickness of said layers to be averaged out, determining the volume of each bunch charge to be separated from said column and adjusting the volume of each charge whenever necessary to produce substantially uniform charges, then separating a bunch charge from an end of said column in the form of a substantially uniform thin flat charge, maintaining said charge in substantially flat condition on said surface, loosely rolling said charge spirally upon itself into bunch like form, constricting said loosely rolled bunch like form peripherally to reduce it diametrically and then applying a binder thereto to form a bunch.

10. The process of producing cigar bunches comprising, forming a column of superimposed bunch length layers of tobacco, compressing said column, testing said column to determine the amount of tobacco to form a charge, separating a thin flat charge having a thickness determined by said testing, locating said charge on said table, and rolling said charge spirally upon itself into a bunch.

11. The process of producing cigar bunches comprising, forming a column of superimposed bunch length layers of tobacco, compressing said column, testing said column to determine the amount of tobacco to form a charge, separating a thin flat charge having a thickness determined by said testing, locating said charge on said table, maintaining said charge in substantially flat condition on said table, rolling said charge thus located and maintained spirally upon itself into loose bunch like form, constricting said bunch like form peripherally to reduce the diameter to substantially that of a finished bunch, and then rolling said constricted bunch like form in a binder to produce a bunch.

JOHN F. HALSTEAD.